United States Patent

[11] 3,629,611

[72] Inventor Allen Leroy Limberg
Somerville, N.J.
[21] Appl. No. 888,365
[22] Filed Dec. 29, 1969
[45] Patented Dec. 21, 1971
[73] Assignee RCA Corporation
Princeton, N.J.

[54] ELECTRONIC PROCESSING APPARATUS
14 Claims, 1 Drawing Fig.

[52] U.S. Cl. .......... 307/235, 307/232, 307/233, 328/134, 329/50
[51] Int. Cl. .......... H03k 5/20
[50] Field of Search .......... 307/232, 235, 233; 328/133, 134; 329/50

[56] References Cited

UNITED STATES PATENTS

| | | | |
|---|---|---|---|
| 3,021,481 | 2/1962 | Kalmus et al. | 328/133 X |
| 3,187,262 | 6/1965 | Crane | 328/133 |
| 3,241,078 | 3/1966 | Jones | 328/133 X |

*Primary Examiner*—Donald D. Forrer
*Assistant Examiner*—John Zazworsky
*Attorney*—Eugene M. Whitacre

ABSTRACT: Average detection apparatus employing pulse-stretching techniques for increasing the energy content and compressing the dynamic pulse width range of a pulse train including randomly occurring, short duration, widely spaced pulses. The pulse train and a train of reference pulses are supplied to a bistable storage element to set and reset the element, respectively, to first and second output states. An average detector is coupled to the output of the storage element.

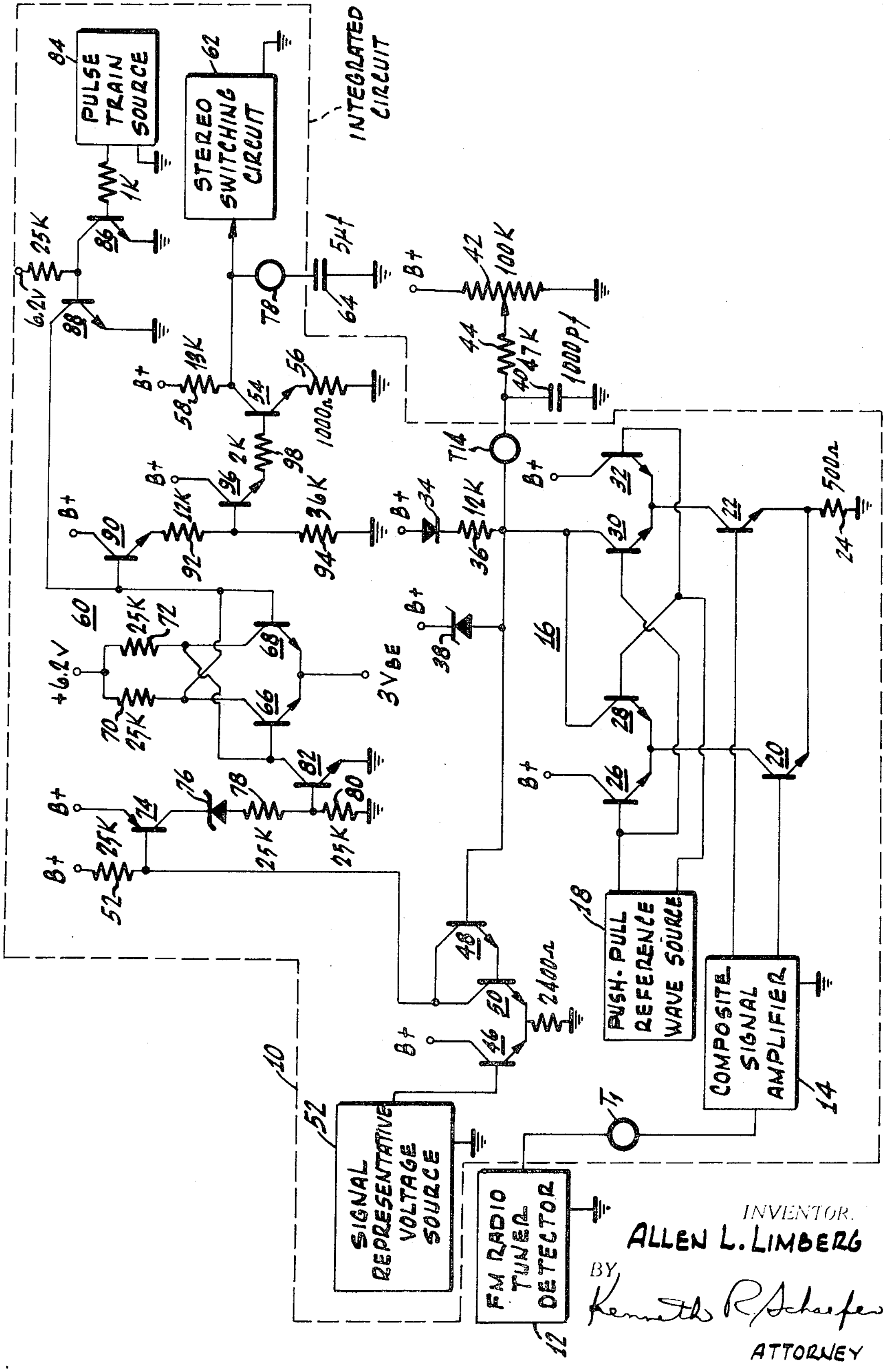
INVENTOR.
ALLEN L. LIMBERG
BY Kenneth R. Schaefer
ATTORNEY

ELECTRONIC PROCESSING APPARATUS

This invention relates to electronic signal processing apparatus and, in particular, to apparatus adapted both for increasing the energy content of short duration pulses to facilitate their measurement by average detection and for effectively amplifying such short duration pulses relative to other accompanying pulses of longer duration (i.e., to compress the dynamic range of a width modulated pulse train) prior to average detection.

In the design of electronic systems, it is sometimes desired to provide means for producing a long term or average indication of particular signals or noise. Where the signals or noise are in the form of low-energy, short duration, randomly occurring, widely spaced pulses, simple average detection techniques (e.g., a circuit including a relatively large capacitance or other approximate integration means) may be inadequate to develop a sufficient output voltage to drive subsequent circuitry. That is, where the pulses to be detected have the characteristics described above, insufficient average energy is available in the pulses for the detector to produce a significant output voltage.

In circuits employing a relatively high direct voltage supply (e.g., vacuum tube circuits and, to a lesser degree, certain discrete transistor circuits) it is possible to sufficiently amplify the voltage level of the pulses to be detected or to process such pulses by clipping and then amplifying the wider base portion of the pulses to produce a meaningful output from a subsequent average detector. Other techniques of increasing the average energy content of such signals are also known but generally require the use of additional capacitors.

Where it is desired to process signals of the type described above by means of circuits fabricated in monolithic integrated form, the use of additional capacitors and high supply voltage is generally either impractical or impossible.

Several specific types of circuits in which the above-described types of signals are encountered desirably may be realized in integrated form. For example, in a television receiver, the deflection or scanning apparatus is synchronized with respect to received synchronizing signal pulses by providing a long term or average comparison on the relative time occurrence of the synchronizing pulses with an output of the receiver scanning apparatus. A phase detector is provided which produces output pulses of short duration (e.g., 2 or 3 microseconds) and relatively low energy. In a typical integrated circuit employing a supply voltage of the order of 10 volts, it is difficult to detect and store information of this character for application to operate subsequent apparatus (e.g., a voltage-controlled oscillator).

Other systems suitable for fabrication in integrated form also exist where it is desirable to provide average detection of similar relatively low level, short duration, recurring signals (or noise). Such a requirement exists in the case of a signal-to-noise detector for detecting the continued presence of a relatively low but unacceptable level of noise accompanying a stereophonic frequency modulation (FM) radio signal such as is described in my concurrently filed U.S. Pat. application Ser. No. 888,308, entitled "Multiplex Decoding System" and assigned to the same assignee as the present invention.

In the latter case, in addition to the problem of low-energy content of the noise to be detected, such information may also be accompanied by short term bursts of high-energy noise which could adversely affect the operation of a simple average detector.

It is therefore desirable to provide means for increasing the energy content of recurring noise representative pulses relative to the energy content of other noise or information which may be present while utilizing a limited available voltage supply.

In accordance with the present invention, bistable storage means are provided having a first input terminal coupled to a source of low energy, recurring pulses such as detected noise pulses. A second terminal is coupled to a source of recurring reference pulses. The bistable storage means also include an output terminal and is responsive to the pulses supplied to the first and second input terminals for producing, at the output terminal, a first output level during each time interval between the occurrence of one of the recurring reference pulses and the next succeeding low-energy pulse and for providing a second output level during each time interval between the occurrence of that low-energy pulse and the next succeeding recurring reference pulse. An average detector is coupled to the output terminal for providing indications related to the presence of the low-energy pulses.

The low-energy pulses are thereby stretched in duration to an extent dependent upon the average period of the recurring reference pulses so that the energy content of the low-energy pulses is increased.

The novel features that are considered characteristic of this invention are set forth with particularity in the appended claims. The invention itself, however, both as to its organization and method of operation, as well as additional objects and advantages, will best be understood from the following description when read in connection with the accompanying drawing which illustrates, partially in block diagram and partially in schematic circuit diagram form, a signal processing circuit constructed in accordance with the present invention.

While the invention may be applicable to various electronic signal processing apparatus, it will be described in connection with stereophonic FM decoding system such as is set forth in detail in my U.S. Pat. application Ser. No. 888,308, entitled "-Multiplex Decoding System" filed concurrently herewith. The illustrated circuits are particularly adapted for fabrication using monolithic integrated circuit techniques.

As used herein, the term monolithic integrated circuit refers to a solid-state structure wherein a plurality of active semiconductor devices such as transistors and diodes, and passive circuit components, such as capacitors and resistors, are constructed of common materials and interconnected by a sequence of processing steps on a common substrate of semiconductor material.

Referring to the drawing, a portion of an FM radio receiver adapted for reception of monophonic or stereophonic broadcast material is illustrated in simplified block diagram form. Those portions shown in block diagram form may employ circuits known in the art or, in the case of the block diagram portions included within the outlines of integrated circuit chip 10, circuits described in may above-identified application Ser. No. 888,308 may be employed. The radio receiver comprises an FM tuner-detector 12 for selectively receiving, amplifying and detecting FM broadcast material. FM tuner-detector 12 produces, at an input terminal $T_1$ of integrated circuit chip 10, either an audiofrequency sum $(L+R)$ signal in the case of reception of monophonic broadcast material or, in the case of reception of stereophonic broadcast material, a composite stereophonic signal comprising a sum $(L+R)$ signal, a pilot (19 kHz.) signal, and a suppressed subcarrier difference $(L-R)$ signal. For convenience, the signal supplied to terminal $T_1$ will be referred to as a composite signal in all cases.

The detected composite signal is coupled to a composite stereo signal amplifier 14 which is arranged to amplify, in a linear manner, signals in the range of approximately 10 Hz. to 150 kHz. so as to produce first and second substantially identical but 180° out of phase (i.e., push-pull) amplified composite signals.

A balanced synchronous noise detector 16 is supplied with the push-pull composite signal outputs from composite signal amplifier 14 and with push-pull (or complementary) square wave outputs from a reference wave source 18. Square waves provided by reference wave source 18 have a fundamental component at a frequency above the highest signal component of the composite signal (i.e., at a frequency corresponding to above-band noise in the composite signal). In the illustrated embodiment, it has been found to be suitable to detect above-band noise at a frequency in the neighborhood of 100 kHz. A particular frequency of 114 kHz. is chosen for convenience with respect to its derivation from an oscillator (not shown)

operating at a frequency which is a harmonic of the 19 kHz. pilot component of the composite signal.

The balanced synchronous noise detector 16 comprises first and second current source transistors 20 and 22. The base electrodes of transistors 20 and 22 are directly connected to separate ones of the push-pull composite signal outputs of the composite signal amplifier 14. The emitter electrodes of transistors 20 and 22 are returned to ground by means of a single resistor 24. The collector electrode of transistor 20 is directly connected to joined emitter electrodes of a first pair of switching transistors 26, 28 while the collector electrode of transistor 22 is directly connected to joined emitter electrodes of a second pair of switching transistors 30, 32. The base electrodes of transistors 26 and 30 are connected to one of the complementary 114 kHz. square wave outputs of reference wave source 18 while the base electrodes of transistors 28 and 32 are connected to the other of the complementary 114 kHz. square wave outputs. A source of operating voltage (B+) is connected directly to the collector electrodes of transistors 26 and 32 and is connected via the series combination of a forward biased voltage dropping diode 34 and a resistor 36 to the joined collector electrodes of transistors 28 and 30. The joined collector electrodes of transistors 28 and 30 are also coupled to a terminal $T_{14}$ of the integrated circuit chip 10 and via a zener diode 38 to the operating voltage (B+) source. A capacitor 40, which determines the bandwidth of the noise detector 16, is coupled externally of the integrated circuit 10 between terminal $T_{14}$ and ground. A noise threshold control comprising an adjustable resistor 42 coupled across the operating voltage source (B+) and a series resistor 44 coupled between terminal $T_{14}$ and the wiper arm of resistor 42 may be provided external to the integrated circuit chip 10 for adjusting the threshold detection level of detector 16. A fixed threshold level also may be provided solely by components within chip 10 such that the circuit elements 42 and 44 may be omitted.

A differential noise sensing amplifier is provided comprising a transistor 46 and a Darlington connected combination of transistors 48 and 50. The base electrode of transistor 48 is coupled to $T_{14}$. The base electrode of transistor 46 is coupled to a signal level representative voltage source 52. Where the gain of amplifier 14 is stable, voltage source 52 only need provide a stable direct voltage.

The output of the differential noise-sensing amplifier comprising transistors 46, 48, 50 is developed across a resistor 52 coupled between the B+ operating voltage source and the joined collector electrodes of transistors 48 and 50. An average detector including means for increasing the duration of noise-representative pulses is coupled to resistor 52. The average detector comprises a detector transistor 54 having an emitter electrode coupled to ground via a resistor 56, a collector electrode coupled to the B+ operating voltage source via a load resistor 58 and a base electrode coupled to a pulse-stretching circuit indicated generally by the reference numeral 60 which will be explained below. The collector electrode of detector transistor 54 is coupled to terminal $T_8$ of the integrated circuit chip 10 and to an output utilization means illustrated as a stereo switching circuit 62. A capacitor 64 is also coupled to terminal $T_8$ and provides filtering of the output at terminal $T_8$.

The pulse-stretching circuit 60 comprises a bistable circuit having first and second transistors 66 and 68 arranged as a set-reset flip-flop. The collector electrodes of transistors 66 and 68 are coupled via respective load resistors 70 and 72 to an operating voltage source (+6.2 v.) while the emitters of transistors 66 and 68 are coupled to a bias voltage source (+3 $V_{BE}$). Noise indicative pulses developed across resistor 52 are coupled to a first input or "set" terminal of the flip-flop 66, 68 (i.e., the base electrode of transistor 66) by means of a voltage translation and amplifying circuit comprising a transistor 74, a zener diode 76, a resistor 80 and a transistor 82. The elements 74, 76, 78 and 80 are coupled in the named order across the B+ operating voltage supply. The resistor 52 is connected to the base electrode of transistor 74 (which is of opposite type conductivity as compared to the vast majority of the transistors on the integrated circuit chip) while the base electrode of transistor 82 is connected to the junction of resistors 78 and 80. The collector electrode of transistor 82 is connected to the base electrode of transistor 66 and to the collector electrode of transistor 68. The base electrode of transistor 68 (a second input or "reset" terminal of the set-reset flip-flop 66, 68) is connected to a source of regularly recurring pulses illustrated as a pulse train source 84.

The pulse train source 84 provides a continuous train of regularly recurring pulses of a polarity suitable for terminating conduction in transistor 68. Amplifying means such as transistors 86 and 88 may be provided between pulse source 84 and the base of transistor 68 if needed. The repetition rate of the pulses supplied by source 84 is selected according to the characteristics of the information which is to be processed. In the present instance, relatively short duration pulses (e.g., 5 to 10 microseconds duration) are provided at a recurrence rate corresponding to 19 kHz. In the case of a stereophonic FM receiver system, the 19 kHz. rate is readily derived, for example, from an oscillator (not shown) which is operating at a frequency harmonically related to 19 kHz.

An output is provided from the collector electrode (output terminal) of transistor 66 by means of a voltage translating arrangement comprising a transistor 90, resistors 92, 94, a further transistor 96 and a resistor 98 coupled to the base of detector transistor 54.

In operation, the push-pull composite signal outputs of amplifier 14 are supplied to current source transistors 20 and 22. Switching transistors 28 and 30 are switched alternately between saturation and cutoff by means of their respective 114 kHz. square wave input signals supplied by reference wave source 18. Noise in the composite signal output of amplifier 14 at or near the 114 kHz. switching rate is translated by the heterodyning action of detector 16 to a band of frequencies extending upwardly from zero frequency while other components in the composite signal are translated outside the low pass characteristics of the filter comprising capacitor 40 and the associated resistors (e.g., resistors 42 and 44). Capacitor 40 is selected in conjunction with such resistors to provide the desired noise detector frequency response. Noise within the predetermined bandwidth around 114 kHz. produces pulses at terminal $T_{14}$. Transistors 48 and 50 are responsive to positive going pulses having an amplitude which, in conjunction with the bias voltage provided via resistor 42 across capacitor 40, is sufficient to overcome the reference bias provided via transistor 46. Each such positive-going pulse, representative of the presence of excessive out-of-band noise, is translated 48, 50, 74, 82 and associated components. The resultant negative-going pulses are coupled to the base electrode of transistor 66 to place the set-reset flip-flop 66, 68 in its set condition (i.e., transistor 66 off, transistor 68 on and the output supplied to transistor 90 in the high voltage level or "1" state). Flip-flop 67, 68 will remain in the "1" state until the next succeeding negative-going transition occurs in the "reset" input supplied to the base electrode of transistor 68 from transistor 88.

When multivibrator 66, 68 is in the 1 state (noise above the threshold present), transistors 90, 96 and 54 are all conductive and capacitor 64 discharges through resistor 56. If the excessive noise is present for a sufficient duration, capacitor 64 discharges sufficiently to activate stereo switching circuit 62 as is described in my application Ser. No. 888,308 referred to above.

In the absence of noise-representative pulses at the set input of flip-flop 66, 68, the pulses supplied to the base of transistor 68 maintain flip-flop 66, 68 in the reset condition (low voltage level or "0" state output) so that transistors 90, 96 and 54 are all turned off. The voltage across capacitor 64 then attains a level determined by the charging rate associated with resistor 58 coupled to the B+ supply.

The apparatus comprising flip-flop 66, 68 and pulse train source 84 serves to stretch the detected noise-representative pulses so as to provide an effective increase in detection gain of such noise pulses without requiring an increase in the amplitude (dynamic range) of signals handled by, for example, detector transistor 54 and preceding transistor stages.

Specifically, it can be seen that the randomly occurring noise-representative pulses, which are characteristically of short duration and varying amplitude, when processed by flip-flop 66, 68 are converted to pulses of varying duration (dependent upon the relative timing of the reset pulse waveform and detected noise pulses) and fixed amplitude (determined by 1 state output voltage of flip-flop 66, 68). Depending upon the relative timing of the reset pulses and the detected noise-representative pulses, the output of flip-flop 66, 68 may be in the 1 state as long as the 19 kHz. period or as short as zero time. Therefore, for randomly occurring noise pulses, the average duration of the processed pulses provided by flip-flop 66, 68 will be one-half the period of the applied 19 kHz. reset waveform (i.e., approximately 25 microseconds).

The noise-representative direct voltage produced at the output (collector electrode) of detector transistor 54 is therefore enhanced or increases by the pulse-stretching operation of flip-flop 66, 68 and associated circuits. In the illustrated circuit, the noise-representative direct voltage is actually the difference between the B+ supply voltage and the voltage across capacitor 64 (i.e., B+ represents no noise, less than B+ voltage represents noise presence).

Other high level, or long duration sporadic (nonrecurring noise pulses also may produce an output from transistors 48, 50 to trigger flip-flop 66, 68 to its set condition. However, the high amplitude pulses have no greater effect on the operation of the noise stretcher 60 than other lower level noise pulses which pass through transistors 48 and 50. That is, the pulse-stretching system provides the same time occurrence dependent transfer characteristic to all pulses sufficient to trigger flip-flop 66, 68 regardless of amplitude above the threshold level. The long duration, nonrecurring type of noise pulses is also effectively attenuated relative to recurring pulses, even though the latter are of short duration.

The above-described system also is arranged to discriminate between actual unacceptable signal-to-noise conditions and certain acceptable signal conditions which might be misconstrued as containing excessive noise.

For example, when the composite signal provided by amplifier 14 includes particularly high level signals (e.g., repetitive cymbal crashes in an orchestral selection), such signals may also be accompanied by spurious ultrasonic components which are produced as a result of overmodulation and the resultant generation of harmonic distortion components at the broadcast transmitter. It is likely that such spurious harmonic components will fall within the band of frequencies to which the noise detector 16 is sensitive. Noise detector 16 therefore is arranged automatically to change the acceptable level of ultrasonic components (e.g., in the vicinity of 114 kHz.) as a function of signal amplitude for high level signals. A noise detector having a threshold which remains fixed under such signal conditions undesirably could cause switching of the stereo switching circuit 62 to the monophonic mode.

Referring to the drawing, the automatic noise threshold adjustment is accomplished by virtue of the manner in which transistors 20, 22, 26, 28, 30 and 32 are arranged. Specifically, when normal or relatively low level composite signals are supplied by amplifier 14 to current source transistors 20 and 22, the switching transistors 26, 28, 30 and 32 operate as a synchronous detector to produce across resistor 36 output signals which are relatively linearly related to the 114 kHz. components of the composite signal. A relatively constant quiescent direct current flows in resistor 36. For high amplitude composite signals, however, one of the transistors 20 and 22 is driven to cutoff as the other is driven to high conduction. This result follows because of the common connection of the emitters of transistors 20 and 22 to resistor 24. Under these conditions, a direct current component greater than the normal quiescent direct current component is produced in resistor 36. For sustained high level composite signals, the direct voltage across resistor 36 will therefore increase and the resultant reference voltage across capacitor 40 will decrease. Therefore, the level of detected noise required to exceed the substantially fixed threshold of operation of transistors 48, 50 (as provided by transistor 46) will increase. Thus for high level composite signals, the acceptable level of components in the composite signal around 114 kHz. is automatically increased.

The above-described operation of the noise detector may also be considered as providing the desirable characteristic of a noise detector which is more sensitive to noise during periods of low signal modulation than during periods of high signal modulation.

It is possible, in view of this self-adjusting characteristic of the noise detector for high and low level signals and the noise amplitude compression characteristics of the noise pulse stretcher described above, to employ a wider detection bandwidth for the noise detector than would be practical in the absence of such characteristics.

Typically a bandwidth (determined essentially by capacitor 40, resistor 36 and resistors 42 and 44 if used) of the order of 20 kHz. may be employed, which results in an acceptable noise sensitivity characteristic for the noise detector. The self-adjusting feature also makes it possible to eliminate the threshold adjustment components 42, 44 without undue restriction on tolerances of remaining components of the detector.

The invention has been described in connection with a particular application. However, it may be used in numerous systems. Furthermore, a particular circuit configuration has been illustrated but modifications may be made according to the requirements of associated apparatus, For example, the average detector 54, 64 is arranged such that capacitor 64 is normally charged and detected noise serves to discharge capacitor 64. It is also suitable to arrange the detector so that capacitor 64 is normally discharged and detected pulses serve to charge capacitor 64. Other modifications may also be made within the scope of the invention.

What is claimed is:

1. Electronic signal processing apparatus for detecting and enhancing the energy content of low energy electrical impulses comprising:

means for supplying relatively low energy, irregularly recurring electrical pulses, means for supplying regularly recurring reference electrical pulses, bistable storage means, having first input terminal coupled to said low energy pulse-supplying means, a second input terminal coupled to said reference pulse-supplying means and an output terminal, said bistable storage means being responsive to said low energy and reference pulses for providing, at said output terminal, a first output level in response to the occurrence of each of said reference recurring pulses and for providing a second output level in response to the occurrence of each of said low energy pulses, the duration of said second output level being, on an average basis, longer than the duration of said low energy pulses, the relative durations of said first and second output levels over a period of time being indicative of continued absence or presence of said low energy pulses, and average detection means coupled to said output terminal and responsive to the relative duration of said first and second levels for providing indications related to the presence or absence of said low energy pulses.

2. Electronic signal processing apparatus according to claim 1 wherein:

said reference recurring pulses recur with an average period greater than the time duration of individual ones of said low energy pulses.

3. Electronic signal processing apparatus according to claim 2 wherein:

said reference pulses recur at a regular rate and the period of said regularly recurring pulses is greater than twice the time duration of individual ones of said low energy pulses.

4. Electronic signal processing apparatus according to claim 3 wherein:

said bistable storage means comprises an electrical flip-flop circuit having two stable states.

5. Electronic signal processing apparatus according to claim 4 wherein:

the amplitudes of said low energy and regularly recurring pulses supplied to said input terminals are sufficient to cause said bistable circuit to change state.

6. Electronic signal processing apparatus according to claim 5 wherein:

the time duration of individual ones of said reference pulses is less than one-half the period thereof.

7. Electronic signal processing apparatus according to claim 3 wherein:

said average detection means provides indications of the sustained presence or absence of said low energy pulses.

8. Electronic signal processing apparatus according to claim 7 wherein:

said average detection means provides an output level proportional to the average rate of occurrence of said low energy pulses.

9. Electronic signal processing apparatus according to claim 3 wherein:

said means for supplying low energy pulses comprises:

means for supplying electrical signals including undesired noise components;

detection means for providing low energy, recurring electrical pulses representative of noise components in excess of a predetermined threshold level.

10. Electronic signal processing apparatus according to claim 9 wherein:

said last-named detection means comprises a synchronous detector for providing low energy, recurring electrical pulses representative of presence in said electrical signals of noise components within a predetermined frequency range.

11. Electronic signal processing apparatus according to claim 10 wherein:

said electrical signals comprise stereophonic frequency modulation composite signals and said frequency of said composite signal.

12. Electronic signal processing apparatus according to claim 11 wherein:

said bistable storage means comprises an electrical flip-flop circuit having two stable states.

13. Electronic signal processing apparatus according to claim 12 wherein:

said frequency range is in the vicinity of 100 kilohertz.

14. Electronic signal processing apparatus according to claim 11 wherein:

said regularly recurring reference pulses recur at a rate of 19 kilohertz.

* * * * *

UNITED STATES PATENT OFFICE
CERTIFICATE OF CORRECTION

Patent No. 3,629,611 Dated December 21, 1971

Inventor(s) Allen LeRoy Limberg

It is certified that error appears in the above-identified patent and that said Letters Patent are hereby corrected as shown below:

Column 1, line 42, the portion reading "comparison on" should read -- comparison of --; line 74, between "second" and "terminal" insert -- input --. Column 2, line 45, "may" should read -- my --. Column 4, line 52, after "translated" insert -- and inverted by means of the circuit comprising transistors --; line 58, "67" should be -- 66 --. Column 5, line 24, "increases" should be -- increased --. Column 8, line 15, after "frequency" insert -- range is above the highest signal frequency --.

Signed and sealed this 17th day of October 1972.

(SEAL)
Attest:

EDWARD M.FLETCHER,JR.
Attesting Officer

ROBERT GOTTSCHALK
Commissioner of Patents